US010133951B1

(12) United States Patent
Mendonca et al.

(10) Patent No.: US 10,133,951 B1
(45) Date of Patent: Nov. 20, 2018

(54) FUSION OF BOUNDING REGIONS

(71) Applicant: A9.com, Inc., Palo Alto, CA (US)

(72) Inventors: Paulo Mendonca, Seattle, WA (US); Zhongwei Cheng, Bothell, WA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/336,172

(22) Filed: Oct. 27, 2016

(51) Int. Cl.
*G06K 9/00* (2006.01)
*G06K 9/32* (2006.01)
*G06K 9/22* (2006.01)
*G06K 9/46* (2006.01)

(52) U.S. Cl.
CPC .............. *G06K 9/325* (2013.01); *G06K 9/22* (2013.01); *G06K 9/4604* (2013.01); *G06K 9/4642* (2013.01)

(58) Field of Classification Search
CPC ......... G06T 2207/10016; G06T 7/2033; G06T 7/20; G06K 9/3233; G06K 9/00777; G06K 9/325; G06K 9/22
See application file for complete search history.

(56) References Cited

U.S. PATENT DOCUMENTS

| | | | | |
|---|---|---|---|---|
| 5,583,949 A * | 12/1996 | Smith | ..................... | G06K 9/481 382/199 |
| 6,597,808 B1 * | 7/2003 | Guo | ..................... | G06K 9/2054 382/173 |
| 8,422,769 B2 * | 4/2013 | Rother | ..................... | G06K 9/34 382/159 |
| 2009/0309966 A1 * | 12/2009 | Chen | ......................... | G06T 7/20 348/135 |
| 2013/0061132 A1 * | 3/2013 | Zheng | ................. | G06F 17/2241 715/234 |
| 2013/0204861 A1 * | 8/2013 | Prieditis | ............ | G06F 17/30241 707/716 |
| 2016/0094774 A1 * | 3/2016 | Li | ...................... | H04N 5/23212 348/222.1 |
| 2016/0328856 A1 * | 11/2016 | Mannino | ................... | G06T 7/73 |

* cited by examiner

*Primary Examiner* — Amir Alavi
(74) *Attorney, Agent, or Firm* — Hogan Lovells US LLP

(57) ABSTRACT

Image data may be downloaded or otherwise obtained. An application executing on the computing device (or at least in communication with the computing device) can analyze the image data to recognize objects represented in the image data as well as determine locations or regions of the image that include the representations. Candidate regions of interest (e.g., bounding boxes) that include at least one detected object can be generated. A single region—a representative region—can be determined from the candidate regions based on user and/or application-defined criterion. The criteria may help ensure that the representative region includes statistical properties that at least satisfy threshold property levels, such as being a consistent estimator of the candidate regions. Notions of "average" or "median" regions can be applied to generate the representative region. The representative region can be associated with a confidence score, which can reflect inconsistency in the candidate regions, and therefore can be associated with a property of the candidate regions and not of the representative region alone.

20 Claims, 7 Drawing Sheets

FUSION OF BOUNDING REGIONS

BACKGROUND

Users are increasingly utilizing electronic devices to obtain various types of information. For example, a user interested in acquiring information about an object can capture an image of the object and submit the captured image to an object recognition service to obtain information associated with the object. As part of the object recognition process, the object recognition service can generate a bounding box around objects for which the user may be interested. However, conventional object recognition services may have difficulty in estimating such bounding boxes, defining a reference bounding box, and/or evaluating the quality of estimated bounding boxes with respect to the reference bounding box. The bounding boxes may not be successfully utilized to recognize objects. As such, may result in the user not obtaining the desired information, which can be potentially frustrating for a user.

BRIEF DESCRIPTION OF THE DRAWINGS

Various embodiments in accordance with the present disclosure will be described with reference to the drawings, in which.

DETAILED DESCRIPTION

Figure 1:
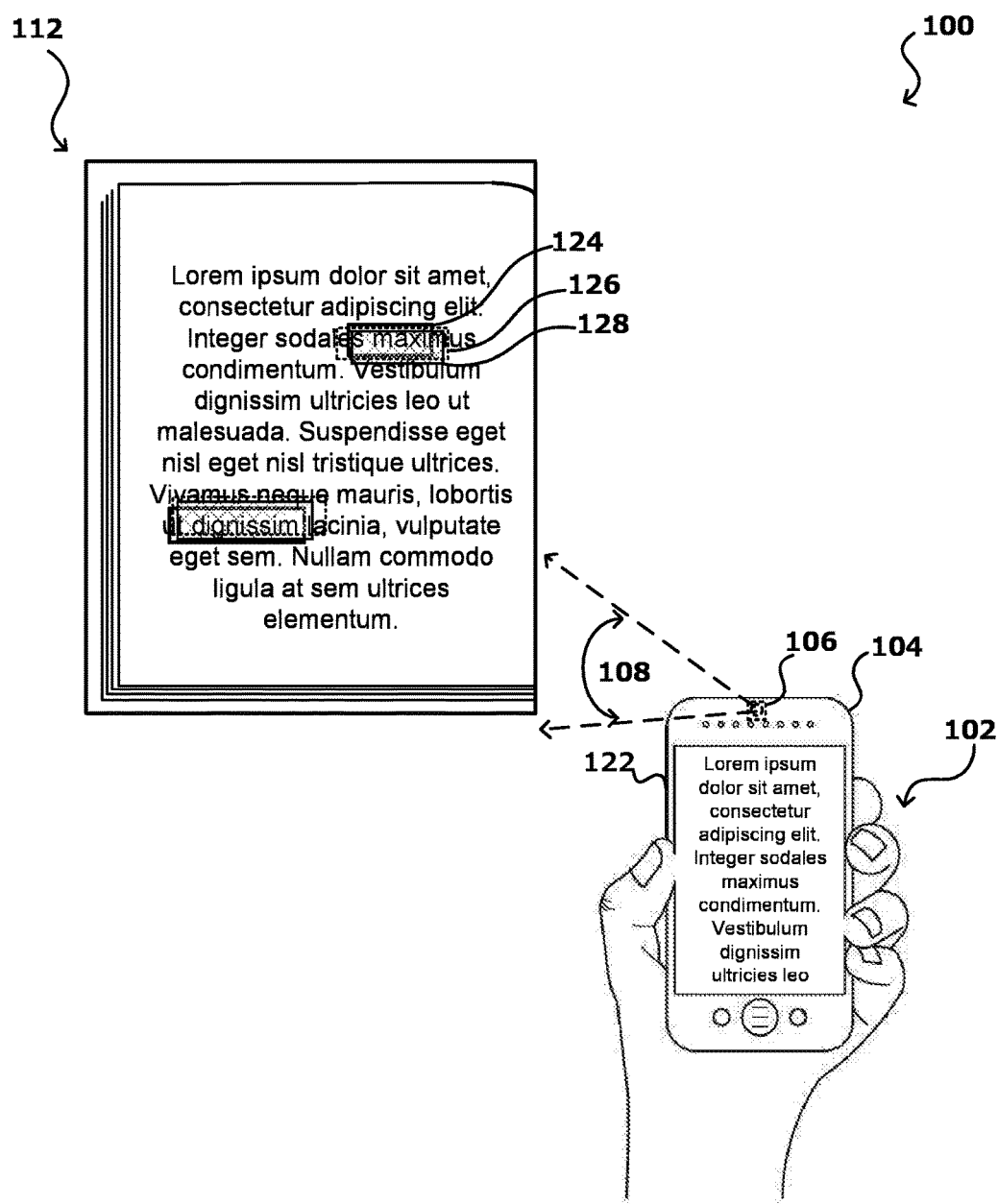
FIG. 1 illustrates an example process in which a user can attempt to capture an image in an attempt to locate information about an object in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-referenced and other deficiencies in conventional approaches to object detection using an electronic device. In particular, various embodiments provide for detecting objects in image data as well as determining a location or region of the image data that includes the object represented in the image data. For example, a camera of a computing device can be used to capture a live camera view of one or more objects. In various embodiments, the image data may be downloaded or otherwise obtained. An application executing on the computing device (or at least in communication with the computing device) can analyze the image data to detect objects represented in the image data as well as determine locations or regions of the image that include the representations. One or more regions of interest (e.g., candidate bounding boxes) that include the detected object can be generated, where each of the regions may be determined using a different algorithm. For example, in accordance with various embodiments, a number of algorithms can be utilized in object detection, where each algorithm may be independently deployed on the same image thereby producing different candidate regions that contain at least a portion of the representation of the object. Additionally or alternatively, at least some of the algorithms can generate not only a single region, but a set of regions for which each region in the set can receive a numerical score that quantifies the "quality" of that region.

Regardless of source (multiple independent algorithms or a single algorithm with multiple outputs), approaches to reconcile a discrepant set of candidate regions are desired if the independent processing of multiple regions is to be avoided. Accordingly, in accordance with various embodiments, a single representative region from a set of candidate regions can be determined based on user and/or application-defined criterion. The criteria may help ensure that the single generated representative region includes statistical properties that at least satisfy threshold property levels, such as being a consistent estimator of the "true" region of interest. Notions of "average" or "median" regions can be rigorously applied to generate the representative region, where the output representative region is not constrained to be an element of the input candidate regions. If, however, such freedom is not desirable, approaches can be constrained to generate a representative region that corresponds to an element of the input candidate regions. In various embodiments, in addition to a representative region for the selected criterion, a statistically rigorous measure of uncertainty can be associated with the representative region, which can reflect inconsistency in the input candidate regions, and therefore can be associated with a property of the input candidate regions and not of the output representative region alone.

In at least one embodiment, the image data can be downloaded, captured, or otherwise obtained. Image capture can be performed using a single image, multiple images, periodic imaging, continuous image capturing, image streaming, and the like. For example, the computing device can capture multiple images (or video) of an object in a continuous mode and provide at least a portion of the same to the recognition system to separately determine bounding boxes from multiple images. The multiple bounding box outputs corresponding from the multiple images can then be compared to either verify image details or to capture details that have been obscured or missed in one image or frame. In another example, a single image can be provided to the recognition system either in real-time or at a later time compared to when the image was captured, such as a previously captured image stored in a photo gallery. Accordingly, at least a portion of these tasks can be performed on a portable computing device or using at least one resource available across a network as well.

Embodiments provide a variety of advantages. For example, in accordance with various embodiments, evaluation of the quality of candidate regions can be utilized by any system that attempts to detect objects. This can include a system for detecting, for example, text, scenes, items, people, etc. In various embodiments, object detecting is an operation in image analysis and processing and an output of object detection is a bounding box or other region, where the image of the detected object lies. Accurate regions allow for the quick identification of a large number of background pixels, which often are irrelevant to subsequent recognition, interpretation, or image enhancement tasks. As such, in accordance with various embodiments, by providing a system that more efficiently detects objects, services utilizing such improvements can optimize resources to allow for more efficiently and quickly detecting such objects. For example, objects in images can be accurately detected and thereafter recognized, and additional information associated with the recognized object can be provided to a user. This can provide for efficient and cost effective interactions, as the additional information can result in a purchase, further use of a service, a loyal customer, etc. For example, in accordance with various embodiments, a set of bounding boxes or graphical outlines that include recognized objects can be displayed overlaying an image generated using the image data. A selection of a bounding box can be received and the selection can be used to submit a query that includes at least the image information in the bounding box. A product listing that includes one or more products can be determined and displayed to a user. Various other types of results can be returned as well as known for such purposes. Upon receiving, from the user, a touch (or other) selection to a product listing, additional information for the associated product(s) can be displayed, enabling the user to learn more about and/or purchase the product from the electronic marketplace through the portable computing device, among other such options. Various other such optimizations can be utilized as well within the scope of the various embodiments as would be apparent to one of ordinary skill in the art in light of the teachings and suggestions contained herein.

FIG. 1 illustrates an example situation 100 in which a user is attempting to recognize text in a book 112. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more items of interest 112 are within a field of view 108 of at least one camera 106 on the computing device. The camera might capture video, such that a "live" view of the captured video information can be displayed on a display screen 122 of the computing device 104. In other embodiments, the camera might capture a still image showing a representation of the item(s) of interest. In at least some embodiments, the image and/or a frame of the video can be analyzed, such as by analyzing on the device or uploading across a network to a service for analyzing image content. It should be noted that in various embodiments the image data can be downloaded to the computing device.

In this example, however, attempting to recognize text in the book using a mobile query image such as that illustrated in FIG. 1 can be difficult. In situations where text recognition is needed against image poorly rendered backgrounds, such as the one illustrated in FIG. 1, such traditional approaches can be difficulty and resource intensive. For example, as shown, some text is missing and the book page is of low quality, which for conventional recognition approaches can result in low quality recognition results. This can include, for example, a recognition service generating a number of bounding boxes (124, 126, 128) which may not correspond to any particular text and/or object. In this situation, there may be no way to verify which bounding box, if any, most accurately includes text. As a result, the bounding boxes may not be successfully utilized to recognize text, which may result in the user not obtaining a fully recognized version of the text. Such a result can be potentially frustrating for a user. Accordingly, in accordance with various embodiments, since different algorithms and recognition engines have different strengths and weaknesses, it can be advantageous to integrate information from multiple recognition engines.

Figure 2:
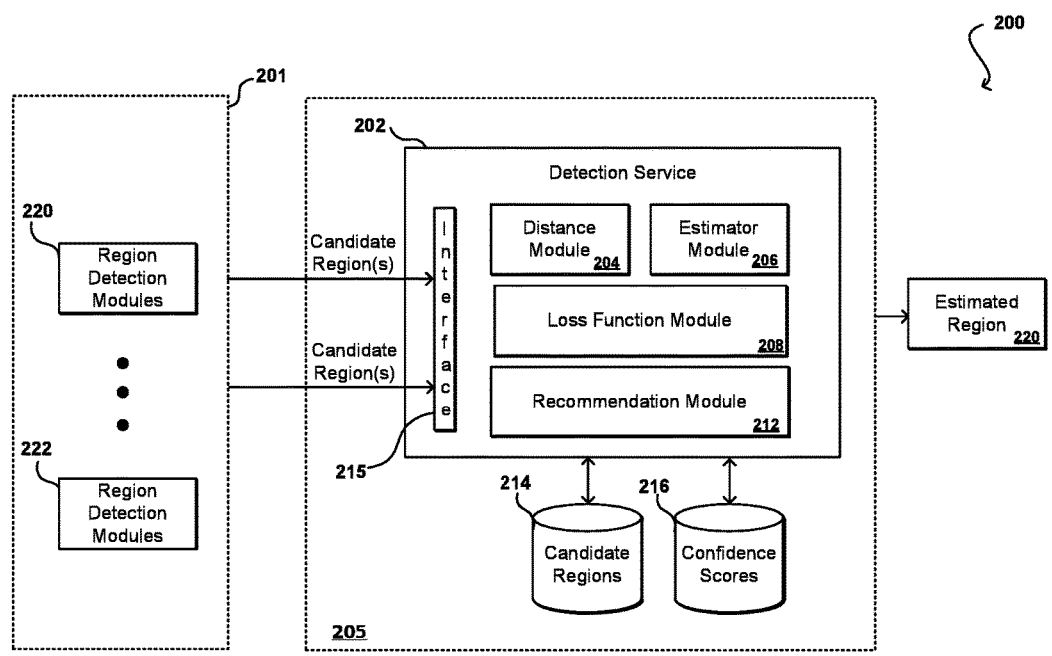
FIG. 2 illustrates an example system for determining a region of interest in accordance with an embodiment.

FIG. 2 illustrates an example system 200 for determining a region of interest in accordance with an embodiment. As shown in FIG. 2, a detection service 202 associated with an entity 205 such a service provider can include a distance module 204, an estimator module 206, a loss function module 208, and a recommendation module 212, although additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

The detection service 202 can communicate with region detection service 201 that includes a number of region detection modules 220, 222. The detection service 202 can receive candidate regions from region detection service 201 and can generate an estimated region 220 or other representative region from the candidate regions that includes at least a portion of the object and/or select a region from the candidate regions that includes at least a portion of the object. In accordance with various embodiments, a region as may include a region or interest can be a shape, bounding contour, or enclosing shape for a point set (S) in N dimensions within which points lie. In this example, the point set (S) can include the pixels in an image. The N dimensions can correspond to the dimensions of the image. In various embodiments, an approach for expressing locations in image data is to use pixel indices, where the image is treated as a grid of discrete elements, ordered from top to bottom and left to right. An example region can be a bounding box. A bounding box can be associated with image coordinates and/or other contour properties that indicate a position of the bounding box in the image data as well as a measure of the image region. For example, the image coordinates can indicate where the shape is positioned in the image data and the contour properties can indicate the type of shape (e.g., rectangle, circle, etc.) and dimensions of the shape. It should be noted that a region may be referred to as a bounding box, a region of interest, a proposed region, a proposal, a region among other such terminology capable of describing a region of an image.

The candidate regions can be associated with a confidence values. For example, as described, a number of algorithms (e.g., object detection algorithms) can be utilized in object detection, where each algorithm may be independently deployed on the same image thereby producing different candidate regions that may contain at least a portion of the representation of the object. Additionally or alternatively, at least some of the algorithms can generate not only a single region, but a set of regions for which each region in the set can receive a numerical score that quantifies the "quality" of that bounding box. The numerical score can be a confidence score that indicates a likelihood that a region includes the object. In at least some embodiments, confidence ranking modules associated with the region detection modules can calculate confidence scores for each region. In at least one example, the confidence ranking modules use algorithms either associated with the region detection modules (220, 222) or as an external customized process.

The candidate regions, associated position and confidence scores (if any) can be received at, for example, a network interface layer 215 of the recognition service. The network interface layer can include any appropriate components known or used to receive requests from across a network, such as may include one or more application programming interfaces (APIs) or other such interfaces for receiving such requests. The network interface layer 215 might be owned and operated by the service provider, or leveraged by the service provider as part of a shared resource or "cloud" offering. The network interface layer can receive and analyze the candidate regions, and cause the candidate regions to be directed to an appropriate system or service of the recognition service. For example, the candidate regions can be directed to distance module 204 and/or stored in data store 214, and/or processed by another module.

Estimator module 206 can be configured to estimate a region from a set of candidate regions that includes the object. As described, the candidate regions can be received from interface 215 and/or obtained from data store 214. Using distance information determined from the distance module 204, the estimator module can determine an "average," "median," or other region of interest that represents a set of regions. An example measure of distance can be the area of intersection over area of union (IoU) between regions. It should be noted; however, that other measures of distance can be used as known in the art, such a Hausdorff distance, an Euclidean distance, etc. In this example, the value of IoU can range from 0 to 1, where an IoU value of 1 corresponds to regions that perfectly overlap and an IoU value of 0 corresponds to regions that do not overlap. It should be noted that other ranges and/or values are possible. In this example, the distance between two candidate regions can be represented by 1 minus IoU. Accordingly, a distance of 0 corresponds to overlapping regions and a distance of 1 corresponds to regions that do not overlap. The area of intersection over area of union between a pair of regions can be determined by computing a ratio of an area of intersection and the area of union of the pair of regions. The area of intersection can be the area of overlap between the pair of regions. The area of union can be the sum of the area of a first region of the pair of regions and the second region of the pair of regions minus the area of overlap between the pair of regions. Various approaches known in the art can be utilized to determine the area of a bounding box and the area of overlap between bounding boxes.

The distance between candidate regions and an initial region can be used by estimator module 206 to determine an estimated region that represents the candidate regions. The initial region can be one of the candidate regions or a region having default or predetermined values. The estimated region can be considered a representative region, as it represents the candidate regions. The estimated region can be determined by determining an average region of the candidate regions, a median region of the candidate regions, or other representation of the candidate regions. For example, the average region can be a region that has a minimum average distance to the candidate regions, such as an average square distance. In this example, a first candidate region can be arbitrarily instantiated as an initialization for the estimation procedure. As described, in certain embodiments, a default region may be instantiated as an initialization for the estimation procedure. In this example, the first candidate region is the initial region. The distance between the initial region and the other candidate regions can be determined. An average distance for the initial region can be determined by taking a sum of the square distances from the initial region to the candidate regions and dividing the sum by the number of candidate regions. The initial region is then refined so as to minimize that sum. For example, one of a position and/or a size of the initial region can be adjusted. For each position and/or size, the sum can be determined. A final region associated with the minimum average square distance can be selected as the estimated region. This final region, having the minimal average square distance to the regions in the candidate set, can be designated as an "average" region, in a manner that those skilled in the art would identify as analogous to the standard notion of average for various types of distributions of values, such as probability distributions.

In another example, the median region can be a region that has a minimum absolute distance to the candidate regions. In this example, a first candidate region can be arbitrarily instantiated as an initialization for the estimation procedure. Similar to above, the distance between the initial region and the other candidate regions can be determined. A median region can be obtained as a region that minimizes the sum of absolute distances between itself and the candidate regions. A final region associated with a minimum absolute distance can be selected as the estimated region. This final region, having minimal average absolute distance to the regions in the candidate set, can be designated as a "median" region, in a manner that those skilled in the art would identify as analogous to the standard notion of median for probability distributions.

In accordance with various embodiments, each region in the candidate set can be weighted to generate and/or select an average region estimate or median region estimate. For example, confidence scores associated with candidate regions can be used as weights when determining the region with minimum average square distance and/or the region with the minimum average absolute distance. As shown in FIG. 2, the confidence scores may be stored in data store 216; however, it should be noted that the confidence scores can be stored in other data stores such as data store 214. The confidence scores can be used in determining the region with minimum average square distance and the region with minimum absolute distance. Thus, the estimated region can be a region that has a minimum weighted average square distance to the other candidate regions or a minimum weighted absolute distance to the other candidate regions.

In certain embodiments, a penalty or other loss function can be applied to candidate regions. For example, a penalty can be applied to candidate regions associated with an IoU that does not satisfy a threshold. An example threshold can be, for example, an IoU of 0.7. In this example, a candidate region associated with an IoU less than 0.7 can be penalized. Penalizing a candidate region affects the score between that candidate region and an estimate of the representative region. For example, in the situation where the IoU of a region in the candidate set of regions and a current estimate of the representative region is 0.4, a penalty of 1 may be applied. Similarly, if the IoU of another region in the input set and the current estimate of the representative region is 0.8, a penalty of 0 may be applied. By seeking a region that minimizes the average penalty with respect to the candidate set, a final representative region can be determined. Further, in various embodiments, the minimization procedure yields the region where the minimal average penalty is achieved (i.e., the representative region or estimated region) and the minimal average penalty itself. The minimal average penalty can be a figure of merit—a "score"—indicating how "good" the representative is.

In certain embodiments, loss function module 208 can be used to manage the threshold level and the magnitude of the penalty to apply. In certain embodiments, ranges of threshold can be used and each threshold range can be associated with a penalty. In certain embodiments, the penalty can be a predetermined value or a value determined using one of a quadratic loss function or an absolute-value loss function. For example, an IoU in a first range may be penalized a first amount, an IoU in a second range may be penalized a second amount, and an IoU in a third range is not penalized. In the situation where a loss function is applied, the penalty is combined with the IoU value. For example, in the situation where the IoU does not satisfy the threshold, e.g., IoU is less than 0.7; a penalty is combined with the IoU. Thus, in accordance with various embodiments, an estimated region can be determined based on distance values, confidence scores, penalties, and/or a combination of these factors. Accordingly, a penalty can be applied to candidate regions that do not satisfy a threshold distance, and an estimated region can be generated that minimizes the penalty.

Recommendation module 212 can be configured to provide a recommendation or evaluation of the candidate regions and/or the estimated/representative region. For example, one of the candidate regions and/or estimated region can be compared to a reference or "true" region. The reference region can be a user-generated region, a region with the highest confidence score, an average of user generated regions, the representative region, or any region that can be used to measure other regions against. In an example, the reference region can be region generated by people. For example, an image of an object can be provided to one or more people and the people can outline the object. The most accurate outline, an average of the outlines, or some other estimator that represents the set of user provided outlines can be used as the reference region to which other regions are compared against.

In accordance with various embodiments, detection service may be performed by any number of server computing devices, desktop computing devices, mainframe computers, and the like. Each individual device may implement one of the modules of the recognition service. In some embodiments, the detection service can include several devices physically or logically grouped together to implement one of the modules or components of the message service. For example, detection service can include various modules and components combined on a single device, multiple instances of a single module or component, etc. In one specific, non-limiting embodiment, distance module 204, estimator module 206, and loss function module 208 can execute on one device and recommendation module 212 can execute on another device. In another embodiment, the modules can execute on the same device.

In some embodiments, the features and services provided by the detection service may be implemented as web services consumable via a communication network. In further embodiments, the detection service is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 3:
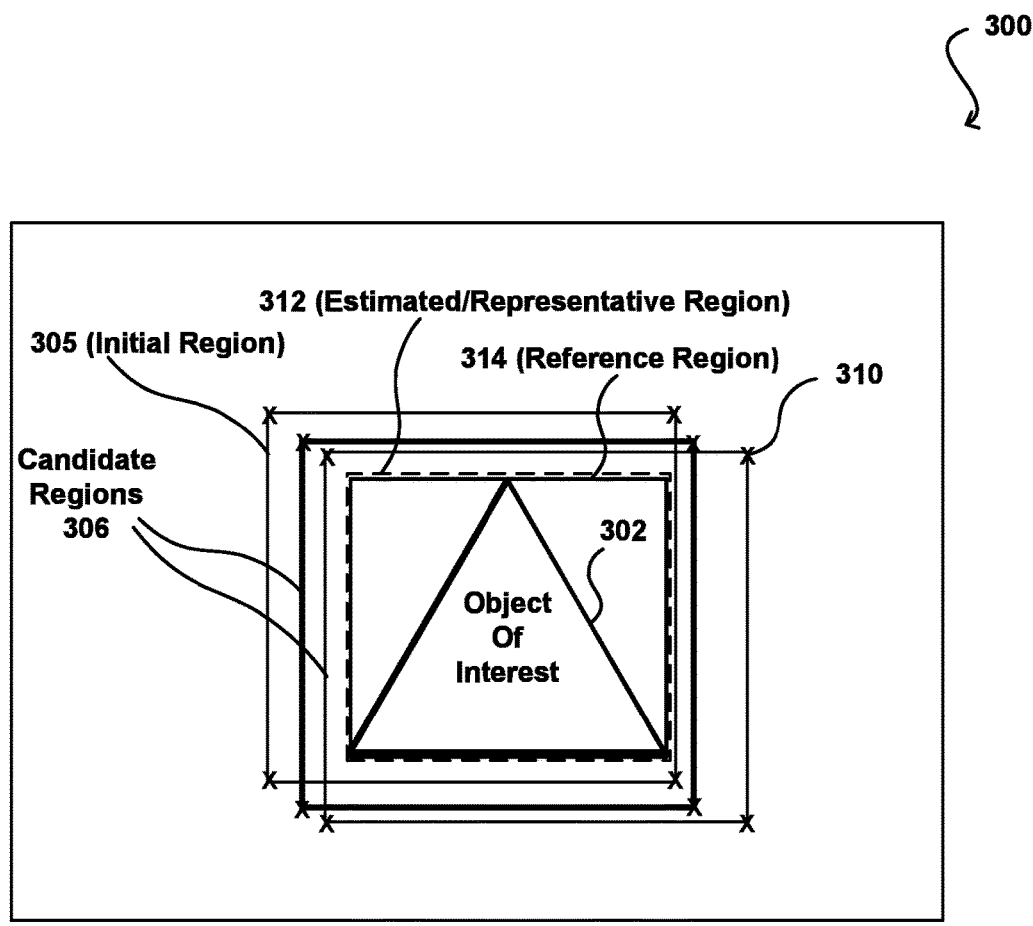
FIG. 3 illustrates an example for determining a region from a set of candidate regions in accordance with various embodiments.

FIG. 3 illustrates example 300 for determining a region from a set of candidate regions in accordance with various embodiments. In this example, image data 301 can be analyzed to detect object of interest 302 as well as determine a location or region of object of interest 302 in image data 301 from one or more candidate regions that include at least a portion of the object of interest. An example candidate region can be a bounding box. FIG. 3 illustrates example bounding boxes 306. A bounding box can be associated with position information that can include coordinates (e.g., image coordinates 310) and/or other contour property information that can indicate a position of a respective bounding box in the image data as well as a measure of an image region for that bounding box. For example, the image coordinates can indicate where a bounding box is positioned in the image data and the contour property information can indicate the type of bounding box (e.g., the shape of the bounding box) and dimensions of the dimensions of the bounding box.

As shown in FIG. 3, candidate bounding boxes 306 substantially include object of interest 302. As described, each candidate bounding box may be determined using a different detection algorithm. For example, in accordance with various embodiments, a number of algorithms can be utilized in object recognition, where each algorithm may be independently deployed on the same image data thereby producing different bounding boxes that include at least a portion of the representation of the object of interest. Additionally or alternatively, at least some of the algorithms can generate not only a single bounding box, but a set of bounding boxes for which each region in the set can receive a confidence score that quantifies the "quality" of that region.

Regardless of source (multiple independent algorithms of a single algorithm with multiple outputs), approaches to reconcile a discrepant set of bounding boxes are desired if the independent processing of multiple bounding boxes is to be avoided. Accordingly, in accordance with various embodiments, a single bounding from a set of bounding boxes can be determined. For example, a distance between bounding boxes 306 and an initial region 305 can be used to determine a single bounding box, such as estimated or representative bounding box 312. As described, the estimated bounding box can be determined by determining an average region of the candidate regions, a median region of the candidate regions, or other representation of the candidate regions. Estimated bounding box 312 is not constrained to be one of the candidate bounding boxes 306. For example, the estimated bounding box can be an "average" or "median" bounding box based at least on the candidate bounding boxes. In another example, a loss function and/or other thresholds can be utilized to cause the estimated bounding box to be selected from the set of candidate bounding boxes. For example, as described, the estimated bounding box can be obtained through the minimization of an average—specifically the average loss. The use of a quadratic loss—i.e., square—results in an "average" region and the use of an absolute-value loss results in a "median" region. Other losses would produce regions with other statistical analogues, and some that may not have a known statistical analogue but are sensible given a specific application.

Once the estimated bounding box is determined, the candidate bounding boxes 306 and/or the estimated bounding box 312 can be compared to a reference bounding box 314 (e.g., a ground truth or gold standard). As described, the reference bounding box 314 can be a user-generated bounding box, a bounding box associated with the highest confidence score of the candidate bounding boxes 306, an average of user generated bounding boxes, the representative bounding box, or any bounding box that can be used to measure other bounding boxes against. In the situation where the representative bounding box is compared against the reference bounding box, an evaluation score or other performance or verification score can be determined that represents how well the representative region represents the candidate bounding boxes. For example, the evaluation score can be compared to a threshold evaluation score. In the situation where the evaluation score satisfies the threshold evaluation score, a determination can be made that the representative bounding box indeed represents the candidate bounding boxes. In the situation where the evaluation score does not satisfy the threshold evaluation score, a determination can be made to assess the approaches in generating the estimated bounding box. In the situation where candidate bounding boxes are compared against the reference bounding box, respective assessment scores that represent a figure of merit for the quality of that bounding box can be determined. The assessment scores can be utilized to assess the performance of the detection algorithms used to determine the candidate bounding boxes. For example, the assessment scores can be compared to a threshold assessment score. In the situation where the assessment score satisfies a threshold assessment score, the detection algorithm associated with the respective candidate bounding box can be marked as acceptable and used in other applications (augmented reality, virtual reality, object tracking, etc.) In the situation where the assessment score does not satisfy the threshold assessment score, the detection algorithm used to generate the candidate bounding box associated with that assessment score can be marked as not acceptable. In this case, that algorithm can be reassessed, which can include modifying the algorithm, removing the algorithm, replacing the algorithm, or other such action.

A number of approaches can be used to determine the evaluation and/or assessment score(s). One such approach includes determining a distance metric, for example, in accordance with embodiments described herein, where the distance metric can correspond to a respective score. For example, the distance metric can be between the representative bounding box and the reference bounding box. In this case, the distance metric can be indicative of the quality of the algorithm that produced the representative region, including both the quality of algorithms to generate candidate bounding boxes and, should more than one candidate bounding box be produced, the quality of the algorithm that produced the representative region. In another example, the distance metric can be between candidate bounding boxes and the representative bounding box. In this case, the distance metric can be indicative of the quality of the algorithms that produced the bounding boxes. If respective scores do not satisfy a threshold, measures can be taken to correct the situation, such as modifying algorithms to generate the candidate bounding boxes.

Figure 4:
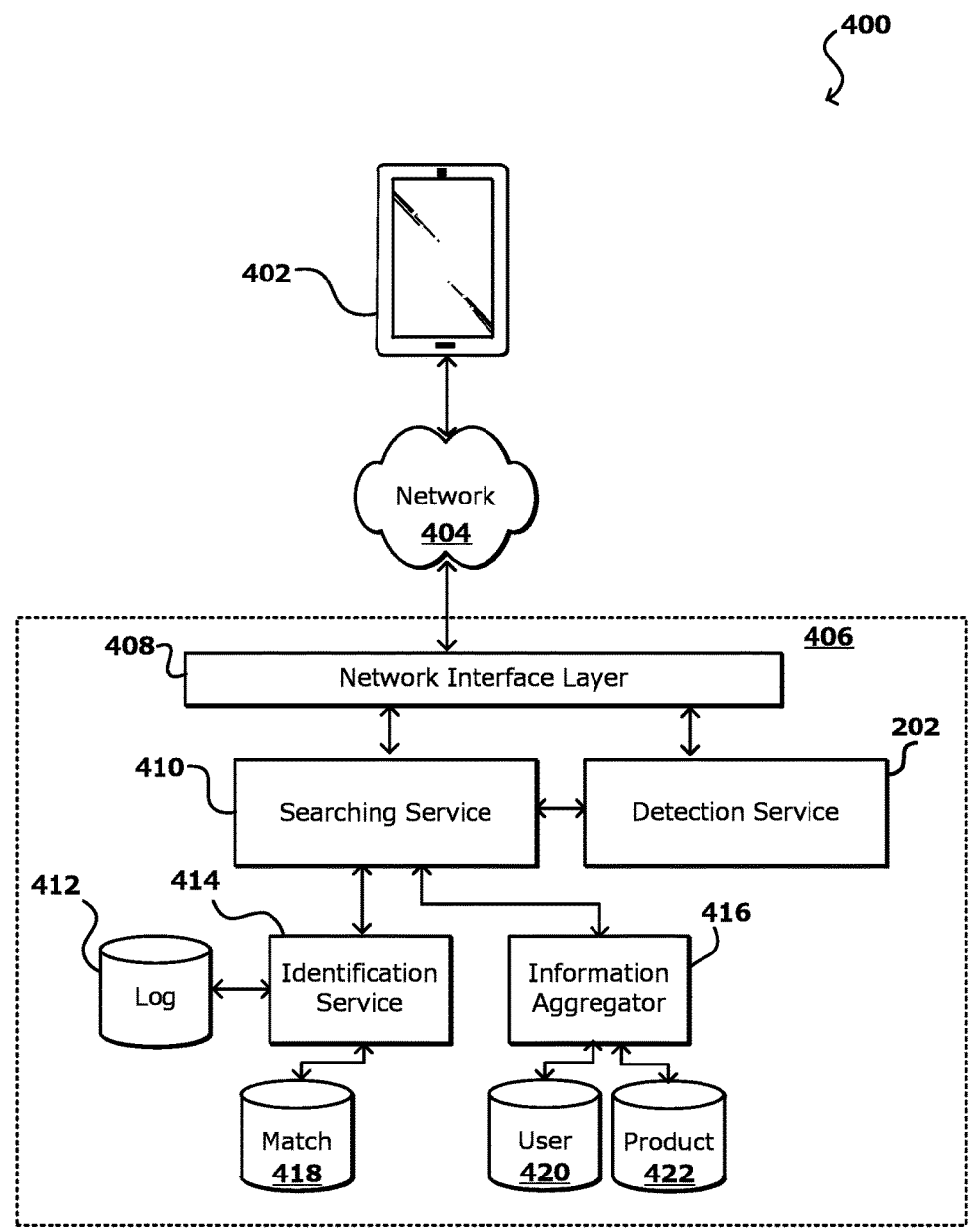
FIG. 4 illustrates an example environment for identifying objects and providing information about those objects that can be utilized in accordance with various embodiments.

FIG. 4 illustrates an example environment 400 for identifying objects and providing information about those objects that can be utilized in accordance with various embodiments. In this example, a user is able to capture image data of a live camera view of one or more objects that include text using a computing device 402. In various embodiments, the image data can be captured image data (e.g., still images and/or video data), downloaded image data, or image data otherwise obtained. An application executing on the computing device (or at least in communication with the computing device) can analyze the image data to recognize any objects represented in the image data as well as determine a location or region of the image that includes the representation of the object.

The computing device can send at least a portion of information across at least one appropriate network 404, such as may include the Internet, a local area network (LAN), a cellular network, and the like. The request can be sent to an appropriate content provider 406, as may provide one or more services, systems, or applications for processing such requests.

In this example, the request is received to a network interface layer 408 of the content provider 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request, and cause at least a portion of the information in the request to be directed to an appropriate system or service, such as a detection service 202 as illustrated in FIG. 2. As described, the detection service can analyze a set of candidate regions to estimate locations or regions of the image that include representation of objects.

A searching service 410 in this example includes components operable to receive information for the recognized region (e.g., image data), analyze the image data, and submit queries to a search engine to return information relating to people, products, places, or things that are determined to match the image data within at least an acceptable amount of deviation, within an allowable matching threshold, etc. For example, the searching service 410 in this example can cause information to be sent to at least one identification service 414 that is operable to analyze the image data and other information and attempt to locate one or more matches. In at least some embodiments, an identification service 414 will process the image data and other information, such as to recognize specific objects, and then compare the processed data against data stored in a matching data store 418 or other such location. In various embodiments, the identification service utilizes one or more search engines to determine one or more matches. The data in an image matching data store 418 might be indexed and/or processed to facilitate with matching, as is known for such purposes.

The searching service 410 can receive information from each contacted identification service 414 as to whether one or more matches could be found with at least a threshold level of confidence, for example, and can receive any appropriate information for a located potential match. The information from each identification service can be analyzed and/or processed by one or more applications of the searching service, such as to determine data useful in obtaining information for each of the potential matches to provide to the user. For example, a searching service might receive labels, categorization data, text, phrases, bar codes, product identifiers, or any other types of data from the identification service(s), and might process that data to be provided to a service such as an information aggregator service 416 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 416 can utilize the aggregated data from the searching service 410 to attempt to locate products, in a product data store 422 or other such location, which are offered through the marketplace and that match, or are otherwise related to, the potential match information. For example, if the identification service identifies a matching object, the information aggregator can attempt to determine whether objects of that type are offered through the marketplace, or at least for which information is available through the marketplace. In at least some embodiments, the information aggregator can utilize one or more suggestion algorithms of a search engine or other such approaches to attempt to determine related elements that might be of interest based on the determined matches. In some embodiments, the information aggregator can return various types of data (or metadata) to the searching service, as may include item description, availability, reviews, and the like. In other embodiments, the information aggregator might instead return information such as a product identifier, uniform resource locator (URL), or other such digital entity enabling a browser or other interface on the client device 402 to obtain information for one or more products, etc. The information aggregator can also utilize the aggregated data to obtain various other types of data as well. Information for located matches also can be stored in a user data store 420 of other such location, which can be used to assist in determining future potential matches or suggestions that might be of interest to the user. Various other types of information can be returned as well within the scope of the various embodiments.

The searching service 410 can bundle at least a portion of the information for the potential matches to send to the client as part of one or more messages or responses to the original request. In some embodiments, the information from the identification services might arrive at different times, as different types of information might take longer to analyze, etc. In these cases, the searching service might send multiple messages to the client device as the information becomes available. The potential matches located by the various identification services can be written to a log data store 412 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 406 in FIG. 4, that one or more of these identification services might be operated by third parties that offer these services to the provider.

Figure 5:
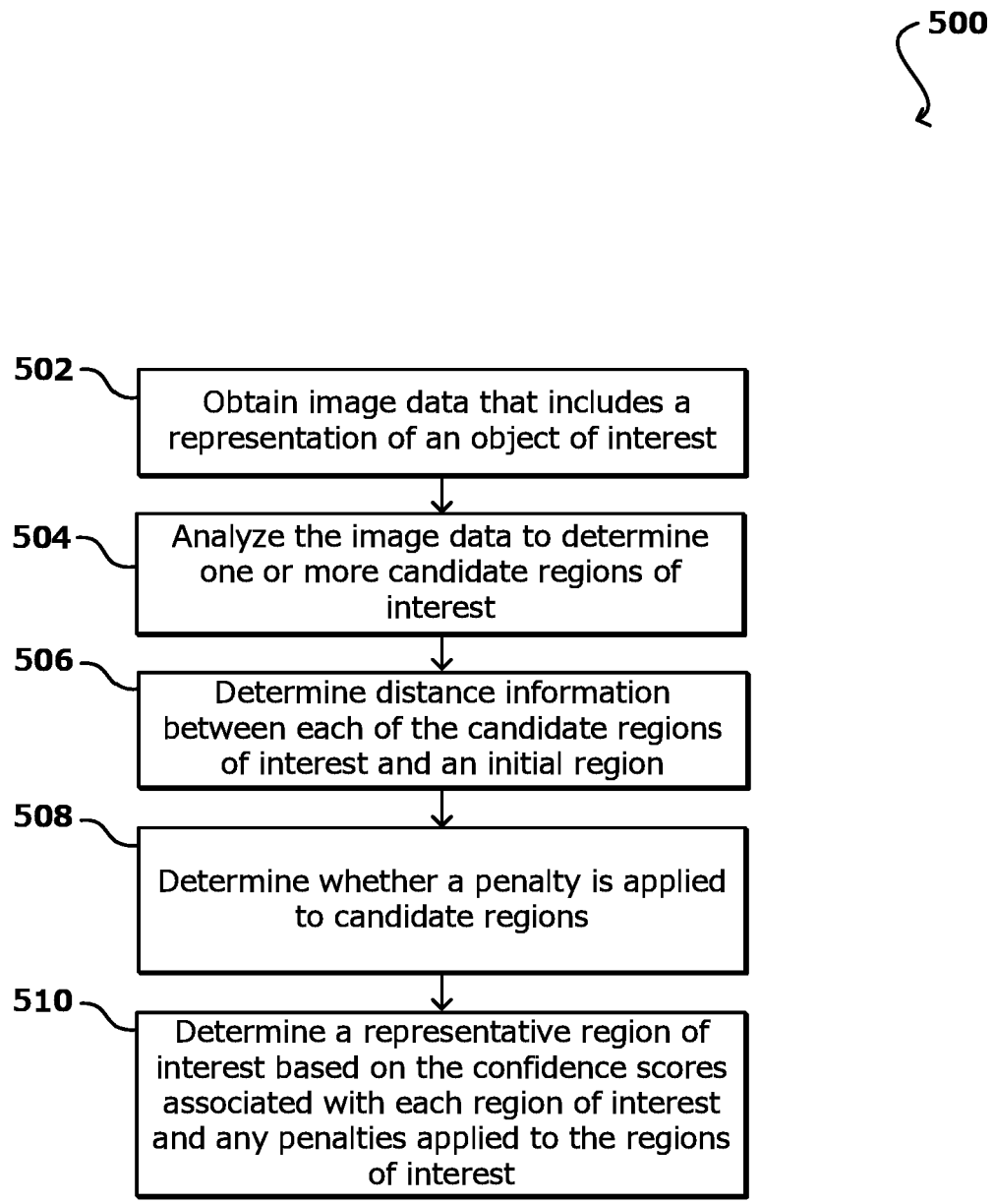
FIG. 5 illustrates an example process for determining a representative region in accordance with various embodiments.

FIG. 5 illustrates an example process 500 for determining a representative region in accordance with various embodiments. It should be understood that there can be additional, fewer, or alternative steps performed in similar or alternative orders, or in parallel, within the scope of the various embodiments unless otherwise stated. In this example, image data that includes a representation of an object of interest can be obtained 502. The image data can be analyzed 504 to determine one or more candidate regions of interest that at least partially include the object of interest. Each of the candidate regions of interest can be associated with a weight such as confidence score that indicates a likelihood that a region of interest includes the object of interest. An example candidate region of interest can be a bounding box. A bounding box can be associated with position information that can include coordinates and/or other contour property information that can indicate a position of a respective bounding box in the image data as well as a measure of an image region for that bounding box. As described, each candidate bounding box may be determined using a different detection algorithm. For example, in accordance with various embodiments, a number of algorithms can be utilized in object recognition, where each algorithm may be independently deployed on the same image data thereby producing different bounding boxes that include at least a portion of the representation of the object of interest. In certain embodiments, at least some of the algorithms can generate not only a single bounding box, but a set of bounding boxes.

Distance information can be determined 506 between each of the candidate regions of interest and an initial region. The initial region can be one of the candidate regions or a region having default or predetermined values. For example, the initial region can be a candidate region of interest associated with a highest confidence score. The distance information can be used to determine a representative region of interest of the candidate regions of interest. As will be described, the representative region of interest can be determined based on the confidence scores associated with each of the candidate regions of interest and any penalty applied to candidate regions of interest, where the penalty applied (if any) is based on the distance between a current estimate of the representative region and each of the candidate regions of interest. An example representative region of interest can be an "average" or "median" region of interest that estimates or otherwise represents the candidate regions of interest. For example, the average region can be a region that has a minimum average distance to the candidate regions, such as an average square distance. In this example, a first candidate region of interest can be instantiated as an initialization for the estimation procedure. The distance between the initial region of interest and the other candidate regions can be determined. An average distance for the initial region of interest can be determined by taking a sum of the square distances from the initial region of interest to the candidate regions and dividing the sum by the number of candidate regions of interest. The initial region is then refined so as to minimize that sum. A final region associated with the minimum average square distance can be selected as the representative region of interest. In another example, a median region of interest can be a region of interest that has a minimum absolute distance to the candidate regions of interest. In this example, a first candidate region of interest can be arbitrarily instantiated as an initialization for the estimation procedure. Similar to above, the distance between the initial region of interest and the other candidate regions of interest can be determined. A median region of interest can be obtained as a region that minimizes the sum of absolute distances between itself and the candidate regions of interest. A final region of interest associated with a minimum absolute distance can be selected as the representative region of interest.

Once the distance information is determined, the distance information is compared 508 to a threshold distance to determine whether a penalty is applied to candidate regions. For example, a penalty can be applied to candidate regions associated with distance information that does not satisfy a threshold. In this case, in the situation where the distance information satisfies a distance threshold, no penalty may be applied. In the situation where the distance information does not satisfy the distance threshold, a penalty may be applied. Thereafter, the representative region of interest can be determined 510 based on the confidence scores associated with each region of interest and any penalties applied to regions of interest. For example, the representative region of interest can be a region associated with a minimum average penalty based at least in part on a distance between the estimated region and each region of the plurality of regions of interest.

In accordance with an embodiment, once the representative region of interest is determined, the representative region of interest can be utilized in a number of different ways. In one example, a classifier can be utilized to analyze image data bound within the representative region of interest to recognize an object represented in the representative region of interest. A label, classification, or other information associated with the object represented in the representative region of interest can be generated. In the situation where a request to provide such information is received from, for example, a user device, the information can be displayed in a popup window, in a side panel, as an overlay, among other such display approaches on a display screen of the user's computing device. In another example, a bounding box (e.g., the estimated bounding box) can be displayed on the display screen overlying an image generated using the image data, where the bounding box can include the detected object. In yet example, the detected object can be emphasized such as by applying visual effects. In another example, classification information associated with the detected object in the representative region of interest can be used to search for various items associated with the classification information, to provide information associated with the classification information, etc. For example, in the situation where the classification information is displayed to the user, the user can select the classification information to be used in a search query to obtain results related to the selected information.

Figure 6:
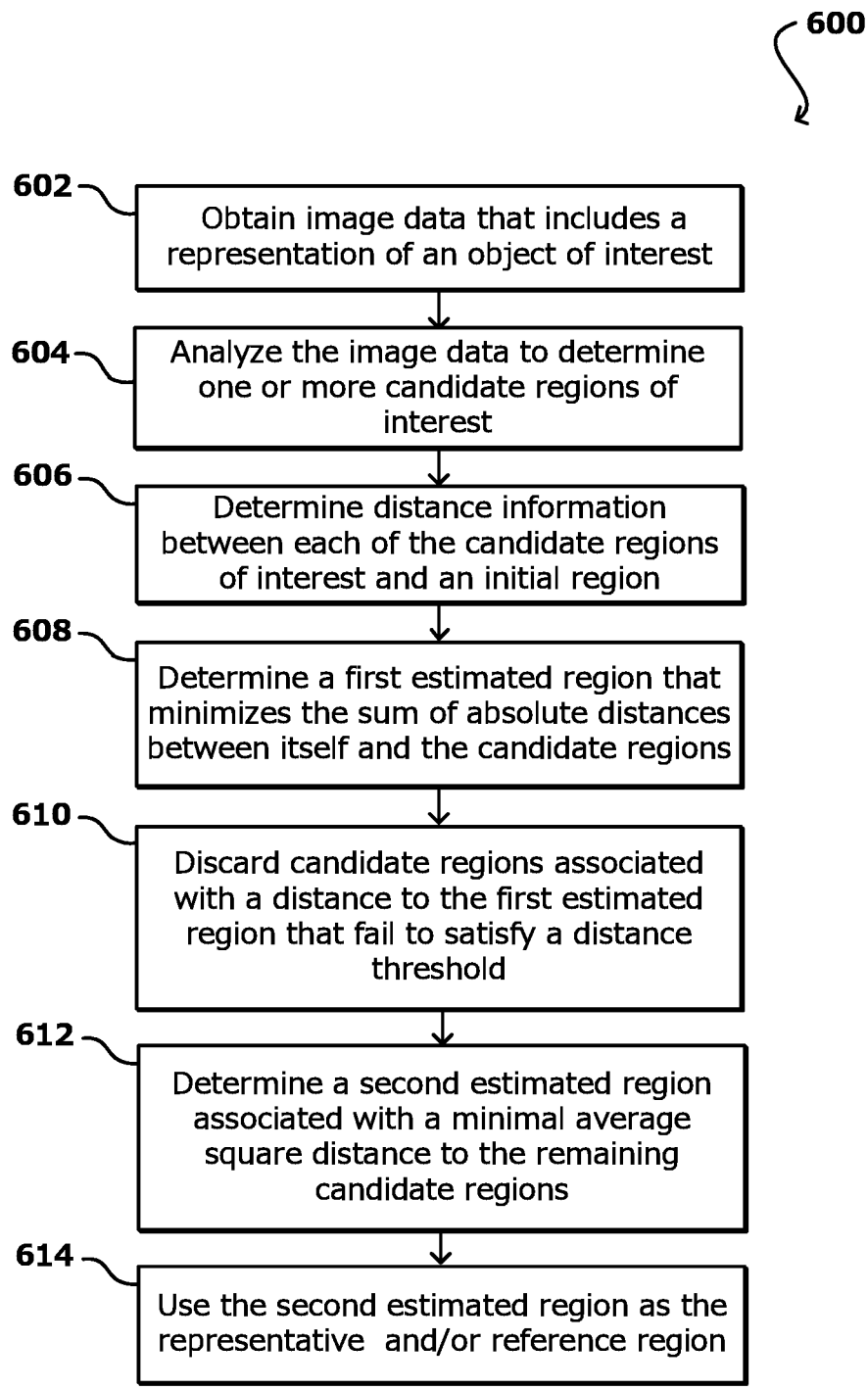
FIG. 6 illustrates an example process for determining a representative region in accordance with various embodiments.

FIG. 6 illustrates an example process 600 for determining a representative region in accordance with various embodiments. As described, the representative region is associated with statistical properties that at least satisfy threshold property levels, such as being a consistent estimator of the "true" region of interest that includes the object of interest. In this example, a two-step process is implemented to determine the representative region. In the first step of the process, image data that includes a representative of an object of interested is obtained 602 and the image data is analyzed 604 to determine one or more candidate regions of interest. Distance information between an initial region and each of the candidate regions of interest can be determined 606. In this example, a first estimated region that minimizes the sum of absolute distances between itself and the candidate regions is determined 608. Thereafter, a distance between the candidate regions and the first estimated region is determined, and candidate regions associated with a distance that fails to satisfy a first threshold distance are discarded 610. The remaining candidate regions are used in the second stage of the process. In the second stage, respective distances between the first estimated region (or other initial region) and the remaining regions are used to determine 612 a second estimated region associated with a minimal average square distance to the remaining candidate regions. As described herein, the second estimated region can be used 614 as a reference and/or reference region. For example, the second estimated region can be used in various applications (e.g., object tracking applications) or used to assess approaches in generating the candidate regions and other such approaches as described herein.

Figure 7:
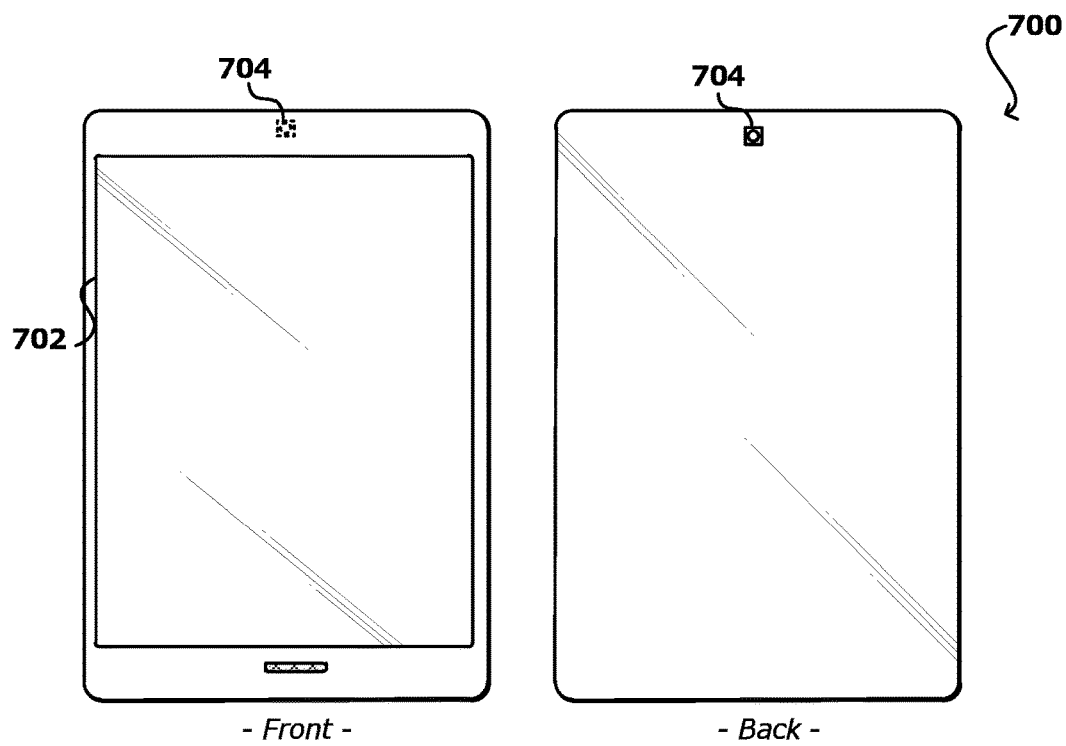
FIG. 7 illustrates front and back views of an example device that can be used in accordance with various embodiments.

FIG. 7 illustrates an example of a computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702, which under normal operation will display information to a user facing the display screen (e.g., on the same side of the computing device as the display screen). The computing device in this example can include one or more image capture elements, in this example including one image capture element 704 on the back side of the device, although it should be understood that image capture elements could also, or alternatively, be placed on the sides or corners of the device, and that there can be any appropriate number of capture elements of similar or different types. Each image capture element 704 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 8:
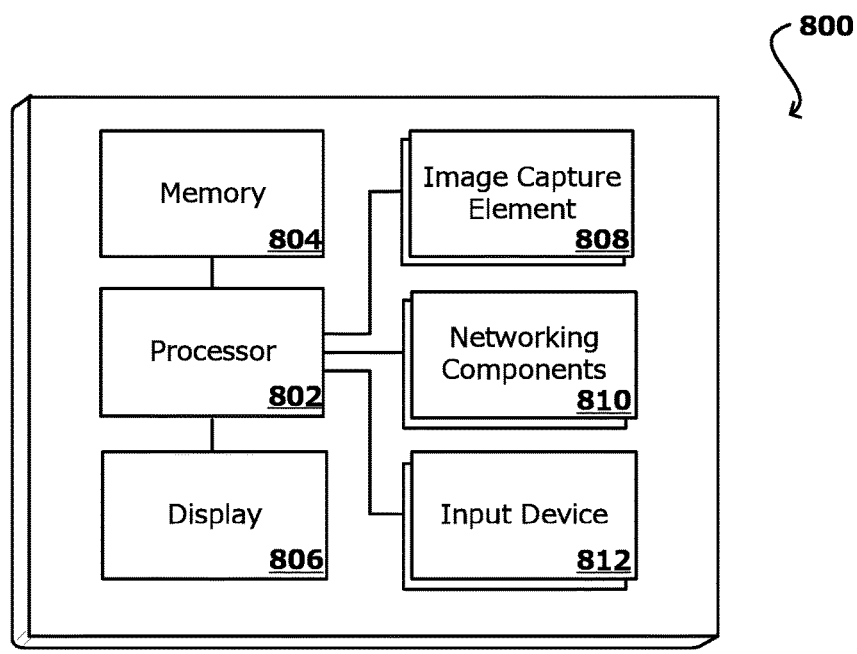
FIG. 8 illustrates example components of a client device such as that illustrated in FIG. 7.

FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 810 enabling the device to communicate with remote systems or services such as content providers and rights determining systems. These components can include, for example, wired or wireless communication components operable to communicate over a network such as a cellular network, local area network, or the Internet. The device can also include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor; and
   memory including instructions that, when executed by the at least one processor, cause the computing device to:
   obtain image data that includes a representation of an object;
   use a region proposal technique on the image data to determine a plurality of candidate bounding boxes by performing steps including:
      processing the image data using a first object detection algorithm, resulting in a first candidate bounding box; and
      processing the image data using a second object detection algorithm, resulting in a second candidate bounding box;
   instantiate an initial bounding box from one of the plurality of candidate bounding boxes;
   determine a distance between each of the plurality of bounding boxes and the initial bounding box to generate a plurality of distances;
   determine a sum of a square of the plurality of distances;
   refine the initial bounding box based at least in part on the sum to determine an estimated bounding box having a minimal average square distance to the plurality of bounding boxes.

2. The computing device of claim 1, wherein the instructions when executed to refine the initial bounding box further cause the computing device to:
   adjust one of a size or position of the initial bounding box to minimize the sum.

3. The computing device of claim 1, wherein the instructions when executed further cause the computing device to:
   determine an area of intersection between one of the candidate bounding boxes and the initial bounding box;
   determine an area of union between the one of the candidate bounding boxes and the initial bounding box; and
   determine an intersection over union between the one of the candidate bounding boxes and the initial bounding box based at least in part on a ratio of the area of intersection and the area of union, wherein the intersection over union corresponds to a respective distance.

4. The computing device of claim 1, wherein the instructions when executed further cause the computing device to:
   apply a loss function to distances of the plurality of distances based at least in part on each respective distance.

5. A computer-implemented method, comprising:
   obtaining image data, the image data including a representation of an object;
   determining a plurality of regions of interest by performing steps including:
      processing the image data using a first object detection algorithm, resulting in a first region of interest; and
      processing the image data using a second object detection algorithm, resulting in a second region of interest;
   specifying a notion of distance between an initial region and each of the plurality of regions of interest;
   specifying a penalty to apply to regions of interest based at least in part respective distances; and
   determining an estimated region associated with a minimum average penalty based at least in part on a distance between the estimated region and each region of the plurality of regions of interest.

6. The computer-implemented method of claim 5, further comprising:
   capturing the image data using a camera of a computing device; and
   using object region proposal techniques to determine the plurality of regions of interest.

7. The computer-implemented method of claim 5, further comprising instantiating an initial region of interest, the initial region of interest being at least one of a default region of interest or one of the plurality of regions of interest.

8. The computer-implemented method of claim 7, further comprising:
   determining an area of intersection between the initial region of interest and one of the plurality of regions of interest;
   determining an area of union between the initial region of interest and the one of the plurality of regions of interest; and
   determining an intersection over union between the initial region of interest and the one of the plurality of regions of interest based at least in part on a ratio of the area of intersection and the area of union, wherein each the intersection over union corresponds to a distance between the initial region of interest and the one of the plurality of regions of interest.

9. The computer-implemented method of claim 8, wherein determining the area of union further comprises:
   determining an area of overlap between the initial region of interest and the one of the plurality of regions of interest, the initial region of interest associated with a first area and the one of the plurality of regions of interest associated with a second area; and
   determining a sum of the first area and the second area, wherein the area of union is the sum minus the area of overlap.

10. The computer-implemented method of claim 8, wherein determining the area of intersection includes:
    determining an area of overlap between the initial region of interest and the one of the plurality of regions of interest of the plurality of regions of interest.

11. The computer-implemented method of claim 8, wherein determining the intersection over union further comprises determining a ratio of the area of intersection and the area of union.

12. The computer-implemented method of claim 5, wherein the penalty includes applying one of a quadratic loss function or an absolute-value loss function.

13. The computer-implemented method of claim 5, wherein the notion of distance is one of a Hausdorff distance, a Euclidean distance, an intersection over union value.

14. The computer-implemented method of claim 5, wherein each region of interest of the plurality of regions of interest is associated with a respective confidence score, each respective confidence score indicating a likelihood that the representation of the object is included in a respective region of interest.

15. The computer-implemented method of claim 14, further comprising: determining the estimated region based at least in part on the respective confidence scores.

16. The computer-implemented method of claim 5, further comprising:
verifying at least one of the plurality of regions of interest against a reference region of interest, wherein the reference region of interest is one of a predetermined region of interest, a user-designated region of interest, or a region of interest in the plurality of regions of interest associated with a highest confidence score.

17. A computing device, comprising:
at least one processor; and
memory including instructions that, when executed by the at least one processor, cause the computing device to:
obtain image data, the image data including a representation of an object;
determine a plurality of regions of interest by performing steps including:
processing the image data using a first object detection algorithm, resulting in a first region of interest; and
processing the image data using a second object detection algorithm, resulting in a second region of interest;
specify a notion of distance between regions of interest;
specify a penalty that is based at least in part on a distance between two regions of interest; and
determine an estimated region associated with a minimum average penalty based at least in part on a distance between the estimated region and each region of the plurality of regions of interest.

18. The computing device of claim 17, wherein each region of interest of the plurality of regions of interest is associated with a respective confidence score, each respective confidence score, and wherein the instructions when executed further cause the computing device to determine the estimated region based at least in part on the respective confidence scores.

19. The computing device of claim 17, wherein the instructions when executed further cause the computing device to:
verify at least one of the plurality of regions of interest against a reference region of interest, wherein the reference region of interest is one of a predetermined region of interest, a user-designated region of interest, or a region of interest in the plurality of regions of interest associated with a highest confidence score.

20. The computing device of claim 17, wherein the instructions when executed further cause the computing device to:
instantiate an initial region of interest, the initial region of interest being at least one of a default region of interest or one of the plurality of regions of interest.

* * * * *